United States Patent
Cooley

(10) Patent No.: US 10,473,171 B2
(45) Date of Patent: Nov. 12, 2019

(54) EXTENDED TORQUE TUBE

(71) Applicant: GOODRICH CORPORATION, Charlotte, NC (US)

(72) Inventor: Phillip E. Cooley, Troy, OH (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/595,715

(22) Filed: May 15, 2017

(65) Prior Publication Data
US 2018/0328425 A1 Nov. 15, 2018

(51) Int. Cl.
F16D 55/36 (2006.01)
F16D 65/00 (2006.01)
F16F 15/12 (2006.01)
B60T 1/06 (2006.01)
F16D 65/12 (2006.01)
F16D 55/24 (2006.01)
F16D 55/26 (2006.01)
F16D 65/02 (2006.01)
F16F 15/10 (2006.01)
B60T 1/02 (2006.01)
F16D 55/00 (2006.01)

(52) U.S. Cl.
CPC .......... *F16D 65/0006* (2013.01); *B60T 1/065* (2013.01); *F16D 55/36* (2013.01); *F16F 15/12* (2013.01); *B60T 1/02* (2013.01); *B60T 1/06* (2013.01); *F16D 55/24* (2013.01); *F16D 55/26* (2013.01); *F16D 65/02* (2013.01); *F16D 65/12* (2013.01); *F16D 2055/0058* (2013.01); *F16D 2065/132* (2013.01); *F16D 2065/1368* (2013.01); *F16F 15/10* (2013.01)

(58) Field of Classification Search
CPC .......... F16D 55/24; F16D 55/36; F16D 55/44; B64C 25/42; B64C 25/44
See application file for complete search history.

(56) References Cited

U.S. PATENT DOCUMENTS

| 4,944,370 A | * | 7/1990 | Chambers | F16D 55/36 188/264 G |
| 5,107,968 A | * | 4/1992 | Delpassand | B60C 23/18 188/264 G |
| 5,199,536 A | * | 4/1993 | Clark | F16D 55/36 188/264 G |
| 5,310,025 A | | 5/1994 | Anderson | |

(Continued)

FOREIGN PATENT DOCUMENTS

GB 2284027 5/1995

OTHER PUBLICATIONS

European Patent Office, European Search Report dated Sep. 19, 2018 in Application No. 18172384.2-1012.

*Primary Examiner* — Nicholas J Lane
(74) *Attorney, Agent, or Firm* — Snell & Wilmer L.L.P.

(57) ABSTRACT

A torque tube for a brake assembly may include a tube portion having a first centerline axis, a conical back-leg portion extending from the tube portion in a radially outward angled orientation relative to the first centerline axis, and a lip portion disposed at a radially outward end of the conical back-leg portion. The lip portion may have added structural material to improve the structural properties of the torque tube to prevent or mitigate damage that would otherwise be caused by friction-induced vibrations.

11 Claims, 3 Drawing Sheets

(56) References Cited

U.S. PATENT DOCUMENTS

| | | | |
|---|---|---|---|
| 5,323,881 A * | 6/1994 | Machan | F16D 55/36 |
| | | | 188/18 A |
| 5,862,890 A | 1/1999 | Long et al. | |
| 5,992,577 A | 11/1999 | Souetre | |
| 6,631,793 B2 | 10/2003 | Evrard | |
| 6,702,068 B1 | 3/2004 | Riebe | |
| 8,616,344 B2 | 12/2013 | Baden | |
| 8,616,345 B2 | 12/2013 | Rook et al. | |
| 8,950,557 B2 | 2/2015 | Houser | |
| 2004/0154880 A1 * | 8/2004 | Guaraldo | B60T 13/741 |
| | | | 188/71.5 |
| 2005/0224634 A1 * | 10/2005 | Rea | F16D 65/847 |
| | | | 244/10 |
| 2008/0302613 A1 * | 12/2008 | Souetre | F16D 55/36 |
| | | | 188/71.5 |
| 2008/0302614 A1 * | 12/2008 | Souetre | F16D 55/36 |
| | | | 188/71.5 |
| 2012/0325594 A1 | 12/2012 | Rook et al. | |
| 2013/0230075 A1 * | 9/2013 | Selles | B60T 17/22 |
| | | | 374/141 |
| 2015/0136547 A1 * | 5/2015 | Chambard | B23P 6/00 |
| | | | 188/218 XL |
| 2017/0058981 A1 | 3/2017 | Gonzalez et al. | |

* cited by examiner

EXTENDED TORQUE TUBE

FIELD

The present disclosure relates to brake systems, and more specifically, to torque tubes of aircraft brake systems.

BACKGROUND

Aircraft typically have brakes on the wheels to slow the aircraft during aborted takeoffs, landings, and/or while taxiing. Aircraft brake systems generally employ a brake stack comprised of a series of friction disks, which may be forced into contact with one another to stop the aircraft. Under various conditions, brake actuation may yield friction-induced vibration at wear surfaces of the friction disks, which can cause out-of-plane motion (also known as "whirl"). This friction-induced vibration may lead to damage of brake system hardware.

SUMMARY

In various embodiments, the present disclosure provides a torque tube for a brake assembly. The torque tube may include a tube portion having a first centerline axis, a conical back-leg portion extending from the tube portion in a radially outward angled orientation relative to the first centerline axis, and a lip portion disposed at a radially outward end of the conical back-leg portion. The lip portion has a proximal surface, a distal surface, and a radially outward surface, according to various embodiments, the lip portion may define a hole extending from the proximal surface to the distal surface that is configured to receive a fastener for mounting a brake stack of the brake assembly. The hole may have a second centerline axis that is substantially parallel to the first centerline axis. A first radial dimension is defined between the second centerline axis and the radially outward surface of the lip portion, wherein the distal surface of the lip portion comprises a truncated section extending perpendicular or oblique to the first centerline axis and the second centerline axis, according to various embodiments. The truncated section has a second radial dimension that is less than 2.2 times the first radial dimension, according to various embodiments.

In various embodiments, the second radial dimension is less than 2 times the first radial dimension. In various embodiments, the second radial dimension is less than 1.5 times the first radial dimension. In various embodiments, the second radial dimension is less than the first radial dimension. In various embodiments, the truncated section extends perpendicular to the first centerline axis and the second centerline axis. In various embodiments, the radially outward surface is a radially outermost section of the lip portion. In various embodiments, the radially outward surface of the lip portion is directly adjacent the distal surface.

In various embodiments, an angle is defined between the first centerline axis and the conical back-leg portion. A radial dimension may be defined between the second centerline axis and the radially outward surface of the lip portion, wherein the distal surface of the lip portion comprises a truncated section extending perpendicular or oblique to the first centerline axis and the second centerline axis. A truncated dimension may be defined as a distance between the truncated section and an intersection of a projection of a radially inward surface of the conical back-leg portion and a projection of the radially outward surface of the lip portion. In various embodiments, the truncated dimension is less than 2.2 times the radial dimension divided by the tangent of said angle.

In various embodiments, the truncated dimension is less than 2 times the radial dimension divided by the tangent of said angle. In various embodiments, is less than 1.5 times the radial dimension divided by the tangent of said angle. In various embodiments, the truncated dimension is less than the radial dimension divided by the tangent of said angle. In various embodiments, the truncated section extends perpendicular to the first centerline axis and the second centerline axis. In various embodiments, the radially outward surface is a radially outermost section of the lip portion. In various embodiments, the radially outward surface of the lip portion is directly adjacent the distal surface.

Also disclosed herein, according to various embodiments, is a torque tube for a brake assembly that includes a tube portion having a first centerline axis, a conical back-leg portion, and a lip portion. The conical back-leg portion extends from the tube portion in a radially outward angled orientation relative to the first centerline axis, according to various embodiments. The lip portion is disposed at a radially outward end of the conical back-leg portion and the lip portion has a proximal surface, a distal surface, and a radially outward surface, according to various embodiments. The lip portion may define a hole extending from the proximal surface to the distal surface that is configured to receive a faster for mounting a brake stack of the brake assembly. The hole may have a second centerline axis that is substantially parallel to the first centerline axis. The radially inward surface of the conical back-leg portion may continuously extend at the radially outward angled orientation, to the radially outward surface of the lip portion.

In various embodiments, the radially inward surface of the conical back-leg portion is parallel with the distal surface of the lip portion. In various embodiments, a first angle between the first centerline axis and the radially inward surface of the conical back-leg portion has the same magnitude as a second angle between the radially outward surface of the lip portion and the distal surface of the lip portion. In various embodiments, the radially outward surface of the lip portion is parallel with the second centerline axis. In various embodiments, the radially outward surface of the lip portion is directly adjacent the distal surface. In various embodiments, the radially outward surface is a radially outermost section of the lip portion.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Figure 1:
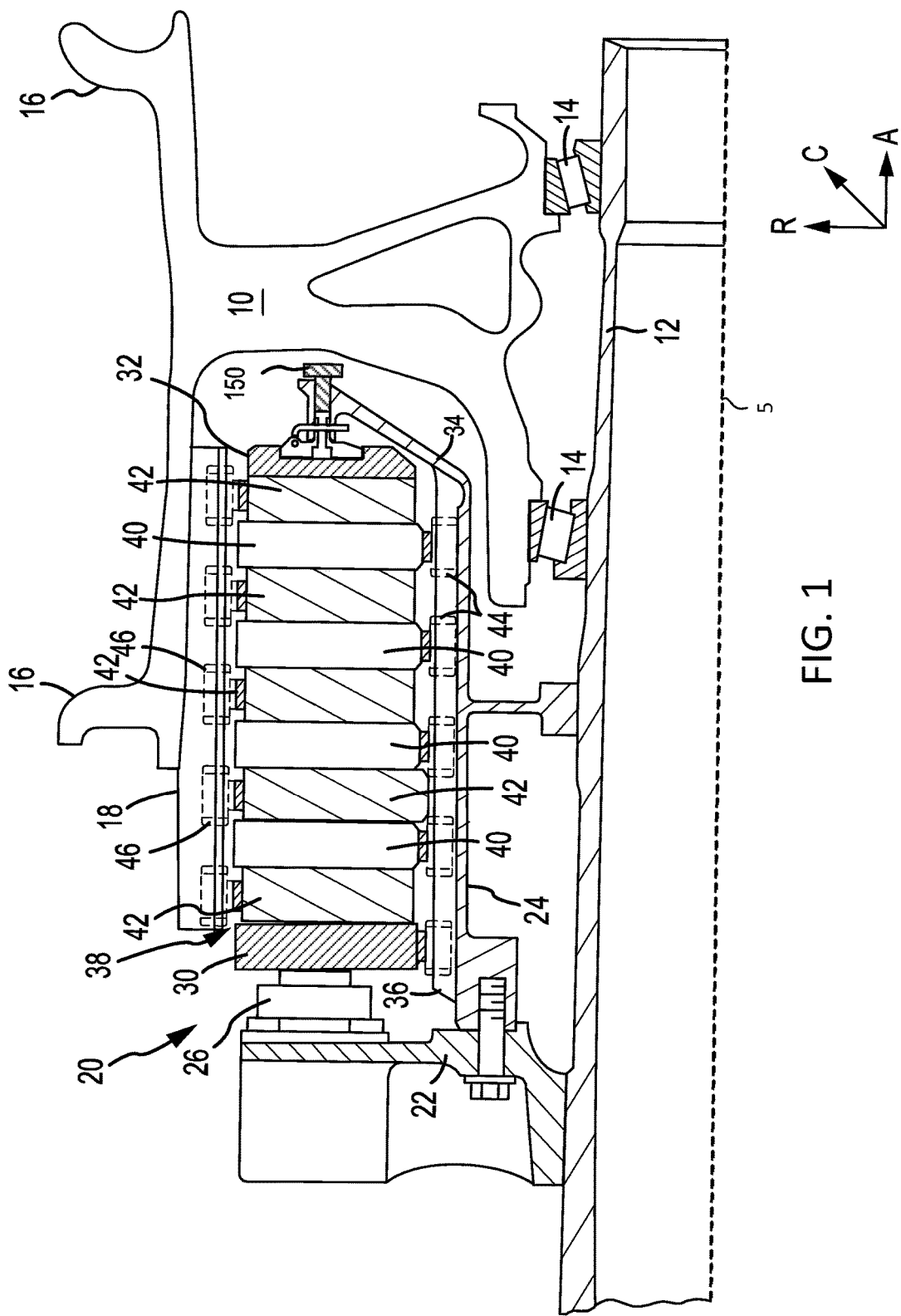
FIG. 1 illustrates a cross-sectional view of a brake assembly, in accordance with various embodiments.

With reference to FIG. 1, a multi-disk brake system 20 is illustrated, in accordance with various embodiments. An A-R-C axis has been included in the drawings to illustrate the axial (A), radial (R) and circumferential (C) directions. Multi-disk brake system 20 may include a wheel 10 supported for rotation around axle 12 by bearings 14. Wheel 10 includes rims 16 for supporting a tire, and a series of axially extending rotor splines 18 (one shown). Rotation of wheel 10 is modulated by multi-disk brake system 20. Multi-disk brake system 20 includes piston housing 22, torque tube 24, a plurality of pistons 26 (one shown), pressure plate 30, and end plate 32. Torque tube 24 is an elongated annular structure that includes a tube portion 25 (with momentary reference to FIG. 2) having a centerline axis 5, a conical back-leg portion 34, and a series of axially extending stator splines 36 (one shown). Conical back-leg portion 34 and stator splines 36 may be integral with torque tube 24, as shown in FIG. 1, or they may each be attached to torque tube 24 as separate components.

Multi-disk brake system 20 also includes a plurality of friction disks 38. The plurality of friction disks 38 includes at least one non-rotatable friction disk 40, also known as a stator, and at least one rotatable friction disk 42, also known as a rotor. Each of the friction disks 38 includes an attachment structure. In various embodiments, and with reference to FIG. 1, each of the four non-rotatable friction disks 40 includes a plurality of stator lugs 44 at circumferentially spaced positions around non-rotatable friction disk 40 as an attachment structure. Similarly, each of the five rotatable friction disks 42 includes a plurality of rotor lugs 46 at circumferentially spaced positions around rotatable friction disk 42 as an attachment structure. In the embodiment of FIG. 1, pressure plate 30, end plate 32, and friction disks 38 are all annular structures made at least partially from a carbon composite material.

Piston housing 22 is mounted to axle 12. Torque tube 24 is bolted or otherwise coupled to piston housing 22 with conical back-leg portion 34 of torque tube 24 proximate an axial center of wheel 10. End plate 32 is connected or mounted to a lip portion 110 (with momentary reference to FIG. 2) of the torque tube 24, as described in greater detail below with reference to FIGS. 2 and 3. End plate 32 is non-rotatable by virtue of its connection or frictional engagement to torque tube 24. Stator splines 36 may support pressure plate 30 such that pressure plate 30 is also non-rotatable. Stator splines 36 may also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Rotatable friction disks 42 are rotatable by virtue of their engagement with rotor splines 18 of wheel 10.

As shown in FIG. 1, rotatable friction disks 42 are arranged with end plate 32 on an end proximate wheel 10, pressure plate 30 on an end distal wheel 10 and proximate pistons 26, and non-rotatable friction disks 40 interleaved so that rotatable friction disks 42 are adjacent to non-rotatable friction components (e.g., interleaved rotors and stators). Pistons 26 are connected to piston housing 22 at circumferentially spaced positions around piston housing 22. Pistons 26 face axially toward wheel 10 and contact a side of pressure plate 30 opposite rotatable friction disks 42. Pistons 26 may be powered electrically, hydraulically, or pneumatically.

In various embodiments, in response to actuation of pistons 26, a force is exerted on the rotatable friction disks 42 and the non-rotatable friction disks 40 towards conical back-leg portion 34. The rotatable friction disks 42 and the non-rotatable friction disks 40 may thus be pressed together between pressure plate 30 and end plate 32.

Figure 2:
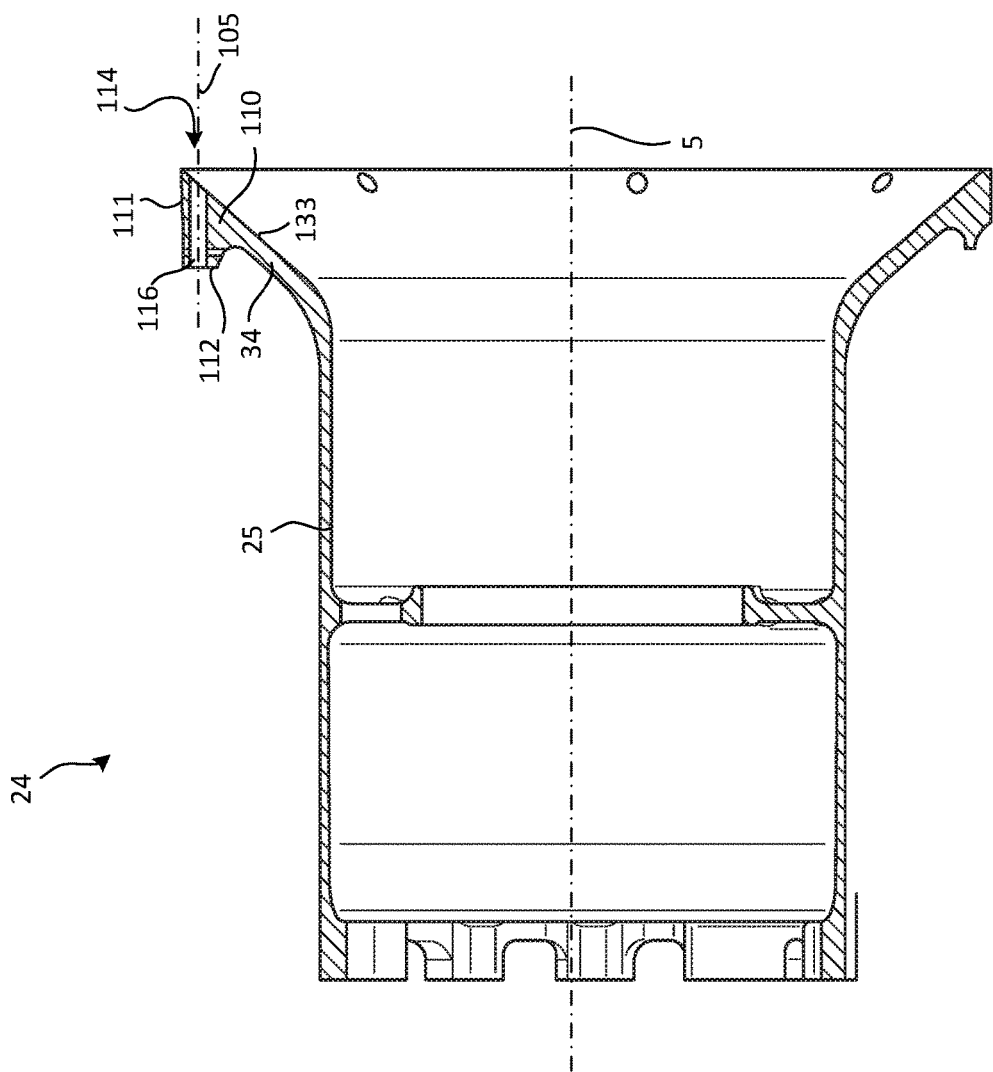
FIG. 2 illustrates a cross-sectional view of a torque tube, in accordance with various embodiments.
Figure 3:
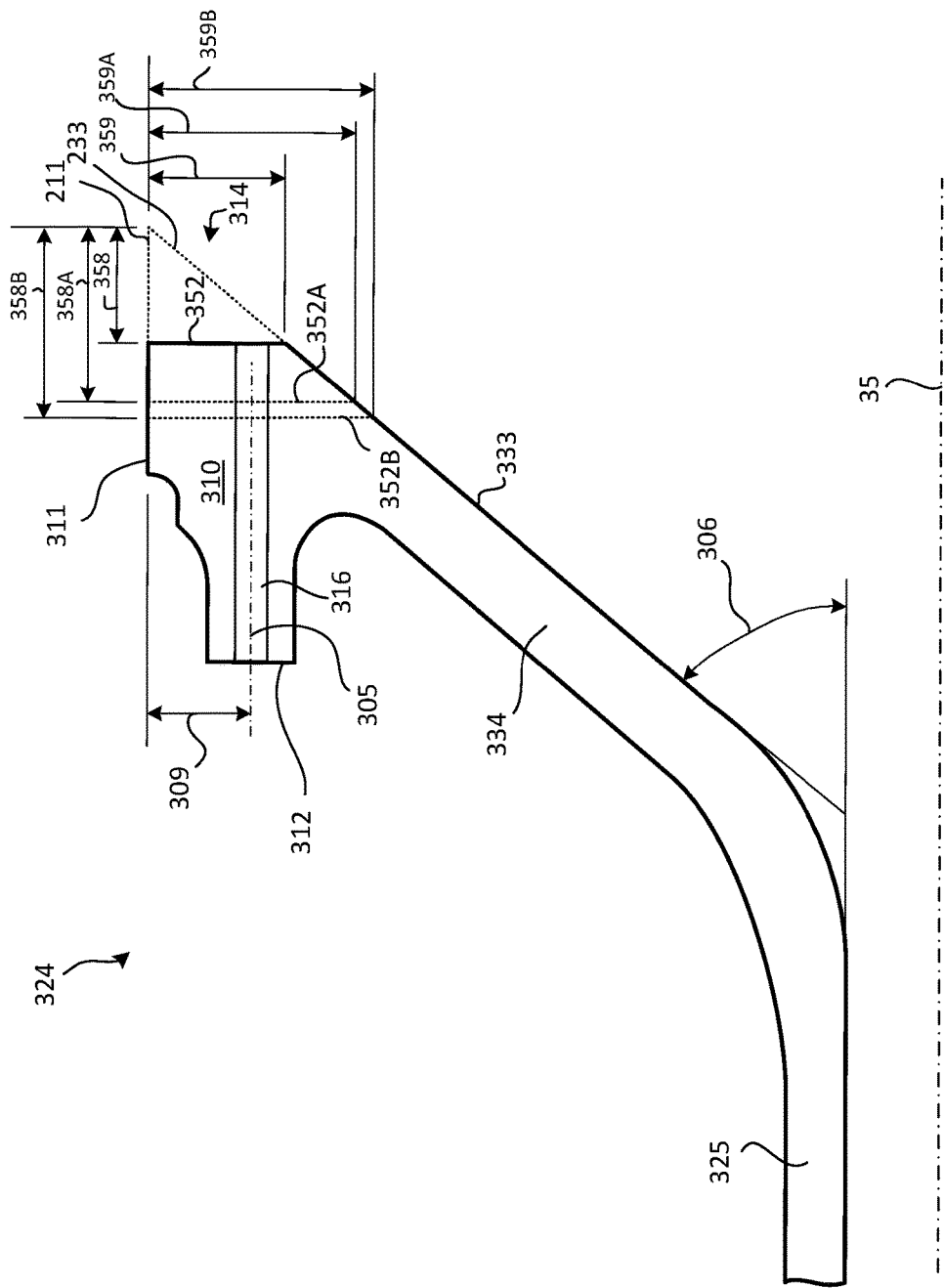
FIG. 3 is a magnified cross-sectional view of a torque tube, in accordance with various embodiments.

Under various conditions, brake actuation may yield friction-induced vibration at wear surfaces of the friction disks. Without sufficient structural support at the torque tube, conventional brake assemblies may experience out-of-plane motion (also known as "whirl"), which may lead to brake assembly damage. The present disclosure, according to various embodiments and with reference to FIGS. 2 and 3, provides a modified torque tube that provides increased structural support to a lip portion of the torque tube. More specifically, and according to various embodiments, the lip portion of the torque has one of two configurations, as described in greater detail below.

In various embodiments, and with reference to FIG. 2, the torque tube 24 has a tube portion 25, a conical back-leg portion 34, and a lip portion 110. The tube portion 25 has a first centerline axis 5, according to various embodiments. The conical back-leg portion 34 extends from the tube portion 25 in a radially outward angled orientation, relative to the first centerline axis 5, towards the wheel 10, according to various embodiments (e.g., angle 306 in FIG. 3 between first centerline axis 35 and conical back-leg portion 334 of torque tube 324). In various embodiments, as described in greater detail below, the conical back-leg portion 34 has a frustoconical shape. The lip portion 110 is disposed at a radially outward end of the conical back-leg portion 34.

In various embodiments and with reference to FIG. 2, in the first configuration the lip portion 110 is an annular structure or a hoop that has a proximal surface 112, a distal surface 114, and a radially outward surface 111. The lip portion 110 may also define one or more holes 116 that extend through the lip portion 110. Fasteners, pins, anchors, lugs, or the like, may be inserted through the one or more holes 116 of the torque tube 24 (e.g., hole 116 may receive a fastener or the like) to connect the brake stack (e.g., the end plate 32) thereto. Accordingly, the one or more holes 116 may extend through the lip portion 110 from the proximal surface 112 to the distal surface 114. Hole 116 may have a second centerline axis 105 that is substantially parallel to the first centerline axis 5.

In the first configuration, the distal surface 114 of the lip portion 110 has a continued conical section. Said differently, the radially inward surface 133 of the conical back-leg portion 34 continuously extends, at the radially outward angled orientation, to the radially outward surface 111 of the lip portion 110, according to various embodiments. In such embodiments, the lip portion 110 does not have a truncated section and thus the conical shape of the conical back-leg portion 34 of the torque tube 24 extends along the entire radially inward surface 133 of the distal portion of the torque tube 24.

In various embodiments, the radially inward surface 133 of the conical back-leg portion 34 is parallel with the distal surface 114 of the lip portion 110. In various embodiments, a first angle between the first centerline axis 5 and the radially inward surface 133 of the conical back-leg portion 34 has the same magnitude as a second angle between the radially outward surface 111 of the lip portion and the distal surface 114 of the lip portion 110. In various embodiments, the radially outward surface 111 of the lip portion 110 is parallel with the second centerline axis 105. In various embodiments, the radially outward surface 111 of the lip portion is directly adjacent the distal surface 114. In various embodiments, the radially outward surface 111 is a radially outermost section of the lip portion 110.

In various embodiments, and with reference to FIG. 3, the torque tube 324 has a tube portion 325, a conical back-leg portion 334, and a lip portion 310. The tube portion 325 has a first centerline axis 35, according to various embodiments. The conical back-leg portion 334 extends from the tube portion 325 in a radially outward angled orientation, relative to the first centerline axis 35, towards the wheel 10, according to various embodiments (e.g., angle 306). In various embodiments, as described in greater detail below, the conical back-leg portion 334 has a frustoconical shape. The lip portion 310 is disposed at a radially outward end of the conical back-leg portion 34.

In various embodiments and with continued reference to FIG. 3, the lip portion 310 is an annular structure or a hoop that has a proximal surface 312, a distal surface 314, and a radially outward surface 311. The lip portion 310 may also define one or more holes 316 that extend through the lip portion 310. Fasteners, pins, anchors, lugs, or the like, may be inserted through the one or more holes 316 of the torque tube 324 (e.g., hole 316 may receive a fastener or the like) to connect the brake stack (e.g., the end plate 32) thereto. Accordingly, the one or more holes 316 may extend through the lip portion 310 from the proximal surface 312 to the distal surface 314. Hole 316 may have a second centerline axis 305 that is substantially parallel to the first centerline axis 35.

In the second of the two configurations, instead of the radially inward surface 133 continuing all the way to the radially outward surface 111 of the lip portion 110, the lip portion 310 is truncated, in accordance with various embodiments. Said differently, the distal surface 314 of the lip portion 310 may have a truncated section/surface 352 that is either perpendicular or oblique (e.g., non-parallel) to the first centerline axis 35 and/or the second centerline axis 305, according to various embodiments. In various embodiments, the truncated section 352 is also non-parallel to the radially inward surface 333 of the conical back-leg portion 334. In various embodiments, the truncated section 352 is substantially perpendicular to the first centerline axis 35 and/or the second centerline axis 305. According to various embodiments, the minor angle between the first centerline axis 35 and the truncated section 352 is greater than the angle 306 between the first centerline axis 35 and the radially inward surface 333 of the conical back-leg portion 334 (e.g., the magnitude of the minor angle between the first centerline axis 35 and the truncated section 352 is larger than the magnitude of angle 306).

A first radial dimension 309 is defined to be a distance between the second centerline axis 305 of hole 316 and the radially outward surface 311 of the lip portion 310, according to various embodiments. The first radial dimension 309 is used herein as a reference for relatively quantifying the extent of increased structural material implemented in the lip portion 310 of the present disclosure. The radially outward surface 311 of the lip portion 310 may be defined, according to various embodiments, as a radially outermost section of the radially outward surface 311. In various embodiments, the radially outward surface is defined as the portion of the radially outward surface 311 that is directly adjacent the distal surface 314.

The truncated section 352 has a second radial dimension 359 that is defined as the distance between the radially outward surface 311 of the lip portion 310 and the transition between the angled, radially inward surface 333 of back-leg portion 334 of the torque tube 324 and the truncated section 352. In this second, truncated configuration, the second radial dimension 359 is less than 2.2 times the first radial dimension 309, according to various embodiments. Said differently, 2.2 times the first radial dimension 309 is the maximum radial height of the truncated section 352. In various embodiments, the second radial dimension 359 is less than 2 times the first radial dimension 309. In various embodiments, the second radial dimension 359 is less than 1.5 times the first radial dimension 309. In various embodiments, the second radial dimension 359 is less than the first radial dimension 309.

Limiting the extent of the truncation of the lip portions 310 and 110 respectively (e.g., limiting the dimensions of the truncated section 352 in FIG. 3 or, said differently, extending the conical back-leg portion 34 in FIG. 2) increases the material in the lip portions 310 and 110 respectively, which can improve the strength of the torque tube and can prevent and/or mitigate friction-induced vibrations (e.g., out-of-plane vibrational movement or "whirl"). By limiting the truncation of the lip portion 310 and/or by relatively extending the conical back-leg portion 34 in the manners described herein, the torque tube goes against conventional teachings that suggest decreasing the lip portion (i.e., increasing the extent of truncation) for weight, cost, and space savings.

FIG. 3 includes dotted lines that superimpose, for example, the features of the first configuration for illustrative purposes. For example, FIG. 3 depicts various projections of the truncated section 352A, 352B showing alternative implementations, and also depicts the associated second radial dimensions 359A, 359B. In various embodiments, truncated section 352B has the maximum second radial dimension 359B that satisfies the criteria described above (e.g., distance 359B is less than 2.2 times distance 309).

In various embodiments, the configuration of the lip portion 310 may be described with reference to truncated dimensions 358. Said differently, the truncated dimension 358 is defined herein as the distance between the truncated section 352, which again extends perpendicularly or obliquely relative to the first and second centerline axes 35, 305, and an intersection of a projection 233 of the radially inward surface 333 of the conical back-leg portion 334 of the torque tube 324 and a projection 211 of the radially outward surface 311 of the lip portion 310. In various embodiments, the truncated dimension 358 is less than 2.2 times the first radial dimension 309 divided by the tangent of the angle 306 between the first centerline axis 35 and radially inward surface 333 of the conical back-leg portion 334. In various embodiments, the truncated dimension 358 is less than 2 times the first radial dimension 309 divided by the tangent of the angle 306 between the first centerline axis 35 and radially inward surface 333 of the conical back-leg portion 334. In various embodiments, the truncated dimension 358 is less than 1.5 times the first radial dimension 309 divided by the tangent of the angle 306 between the first centerline axis 35 and radially inward surface 333 of the conical back-leg portion 334. In various embodiments, the truncated dimension 358 is less than the first radial dimension 309 divided by the tangent of the angle 306 between the first centerline axis 35 and radially inward surface 333 of the conical back-leg portion 334. FIG. 3 depicts various projections of the truncated section 352A, 352B showing alternative implementations, and also depicts the associated truncated dimensions 358A, 358B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque tube for a brake assembly, the torque tube comprising:
    a tube portion having a first centerline axis;
    a conical back-leg portion extending from the tube portion in a radially outward angled orientation relative to the first centerline axis; and
    a lip portion disposed at a radially outward end of the conical back-leg portion, the lip portion having a proximal surface, a distal surface, and a radially outward surface, wherein the lip portion defines a hole extending from the proximal surface to the distal surface that is configured to receive a fastener for mounting a brake stack of the brake assembly, wherein the hole has a second centerline axis that is substantially parallel to the first centerline axis, wherein a first radial dimension is defined between the second centerline axis and the radially outward surface of the lip portion, wherein the distal surface of the lip portion is a truncated section extending perpendicular or oblique to the first centerline axis and the second centerline axis, wherein the truncated section extends from a radially inward surface of the conical back-leg portion and has a second radial dimension, as defined between the radially outward surface of the lip portion and a transition between the radially inward surface of the conical back-leg portion and the truncated section, that is less than 1.5 times the first radial dimension.

2. The torque tube of claim 1, wherein the truncated section extends perpendicular to the first centerline axis and the second centerline axis.

3. The torque tube of claim 1, wherein the radially outward surface is a radially outermost section of the lip portion.

4. The torque tube of claim 1, wherein the radially outward surface of the lip portion is directly adjacent the distal surface.

5. The torque tube of claim 1, wherein at least a portion of a distal end of the hole defined by the truncated section comprises extends to the radially outward angled orientation of the conical back-leg portion.

6. A torque tube for a brake assembly, the torque tube comprising:
a tube portion having a first centerline axis;
a conical back-leg portion extending from the tube portion in a radially outward angled orientation relative to the first centerline axis, wherein an angle is defined between the first centerline axis and the conical back-leg portion; and
a lip portion disposed at a radially outward end of the conical back-leg portion, the lip portion having a proximal surface, a distal surface, and a radially outward surface, wherein the lip portion defines a hole extending from the proximal surface to the distal surface that is configured to receive a fastener for mounting a brake stack of the brake assembly thereto, wherein the hole has a second centerline axis that is substantially parallel to the first centerline axis, wherein a radial dimension is defined between the second centerline axis and the radially outward surface of the lip portion, wherein the distal surface of the lip portion is a truncated section extending perpendicular or oblique to the first centerline axis and the second centerline axis, wherein the truncated section extends from a radially inward surface of the conical back-leg portion, wherein a truncated dimension is defined as a distance between the truncated section and an intersection of a projection of the radially inward surface of the conical back-leg portion and a projection of the radially outward surface of the lip portion, wherein the truncated dimension is less than 1.5 times the radial dimension divided by the tangent of said angle,
wherein at least a portion of a distal end of the hole defined by the truncated section extends to the radially outward angled orientation of the conical back-leg portion.

7. The torque tube of claim 6, wherein the truncated dimension is less than the radial dimension divided by the tangent of said angle.

8. The torque tube of claim 6, wherein the truncated section extends perpendicular to the first centerline axis and the second centerline axis.

9. The torque tube of claim 6, wherein the radially outward surface is a radially outermost section of the lip portion.

10. The torque tube of claim 6, wherein the radially outward surface of the lip portion is directly adjacent the distal surface.

11. A torque tube for a brake assembly, the torque tube comprising:
a tube portion having a first centerline axis;
a conical back-leg portion extending from the tube portion in a radially outward angled orientation relative to the first centerline axis; and
a lip portion disposed at a radially outward end of the conical back-leg portion, the lip portion having a proximal surface, a distal surface, and a radially outward surface, wherein the lip portion defines a hole extending from the proximal surface to the distal surface that is configured to receive a fastener for mounting a brake stack of the brake assembly, wherein the hole has a second centerline axis that is substantially parallel to the first centerline axis, wherein a first radial dimension is defined between the second centerline axis and the radially outward surface of the lip portion, wherein the distal surface of the lip portion is a truncated section extending perpendicular or oblique to the first centerline axis and the second centerline axis, wherein the truncated section extends from a radially inward surface of the conical back-leg portion and has a second radial dimension, as defined between the radially outward surface of the lip portion and a transition between the radially inward surface of the conical back-leg portion and the truncated section, that is less than 1.5 times the first radial dimension;
wherein at least a portion of a distal end of the hole defined by the truncated section extends to the radially outward angled orientation of the conical back-leg portion.

* * * * *